US012506618B2

(12) United States Patent
Eilam et al.

(10) Patent No.: US 12,506,618 B2
(45) Date of Patent: Dec. 23, 2025

(54) DEVICE CONTROL TRANSFER

(71) Applicant: MELLANOX TECHNOLOGIES, LTD., Yokneam (IL)

(72) Inventors: Nir Eilam, Haifa (IL); Yuval Itkin, Zoran (IL); Haim Kupershmidt, Or Yehuda (IL); Yigal Edery, Pardesia (IL); Uriya Stern, Tal Shahar (IL); Boaz Shahar, Ra'anana (IL); Mor Sfadia, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 154 days.

(21) Appl. No.: 18/497,000

(22) Filed: Oct. 30, 2023

(65) Prior Publication Data

US 2024/0205021 A1 Jun. 20, 2024

Related U.S. Application Data

(60) Provisional application No. 63/432,415, filed on Dec. 14, 2022.

(51) Int. Cl.
 *H04L 9/32* (2006.01)
 *H04L 9/08* (2006.01)

(52) U.S. Cl.
 CPC .......... *H04L 9/3247* (2013.01); *H04L 9/0825* (2013.01); *H04L 9/3263* (2013.01)

(58) Field of Classification Search
 CPC .... G06F 21/57; G06F 21/572; G06F 21/6245; H04L 9/0825; H04L 9/3247; H04L 9/3263
 See application file for complete search history.

(56) References Cited

U.S. PATENT DOCUMENTS

| | | | |
|---|---|---|---|
| 2016/0019050 A1 | 1/2016 | Marr et al. | |
| 2017/0180132 A1* | 6/2017 | Osborne | H04L 9/0631 |
| 2021/0073003 A1 | 3/2021 | Jacquin et al. | |
| 2022/0058270 A1 | 2/2022 | Egranov et al. | |

OTHER PUBLICATIONS

Palmer et al., "Ownership and Control of Firmware in Open Compute Project Devices," IBM Corp., pp. 1-8, Nov. 9, 2018.
EP Application # 23216553.0 Search Report dated Apr. 24, 2024.

* cited by examiner

*Primary Examiner* — Olugbenga O Idowu
(74) *Attorney, Agent, or Firm* — Meitar Patents Ltd.; Daniel Kligler

(57) ABSTRACT

In one embodiment, a device includes a memory to store a first public key indicating security ownership of the device by a first owner, an interface to receive a signature of an intermediate public key signed by a first owner signing service with a first private key, and processing circuitry to load the intermediate public key in the memory, responsively to authenticating the signature, and remove the first public key from the memory, and wherein the interface is to receive a second public key and a signature of the second public key signed by a second owner signing service with an intermediate private key, the processing circuitry is to load a second public key in the memory indicating ownership has been transferred to the second owner responsively to authenticating the signature of the second public key with the intermediate public key, and remove the intermediate public key from the memory.

24 Claims, 9 Drawing Sheets

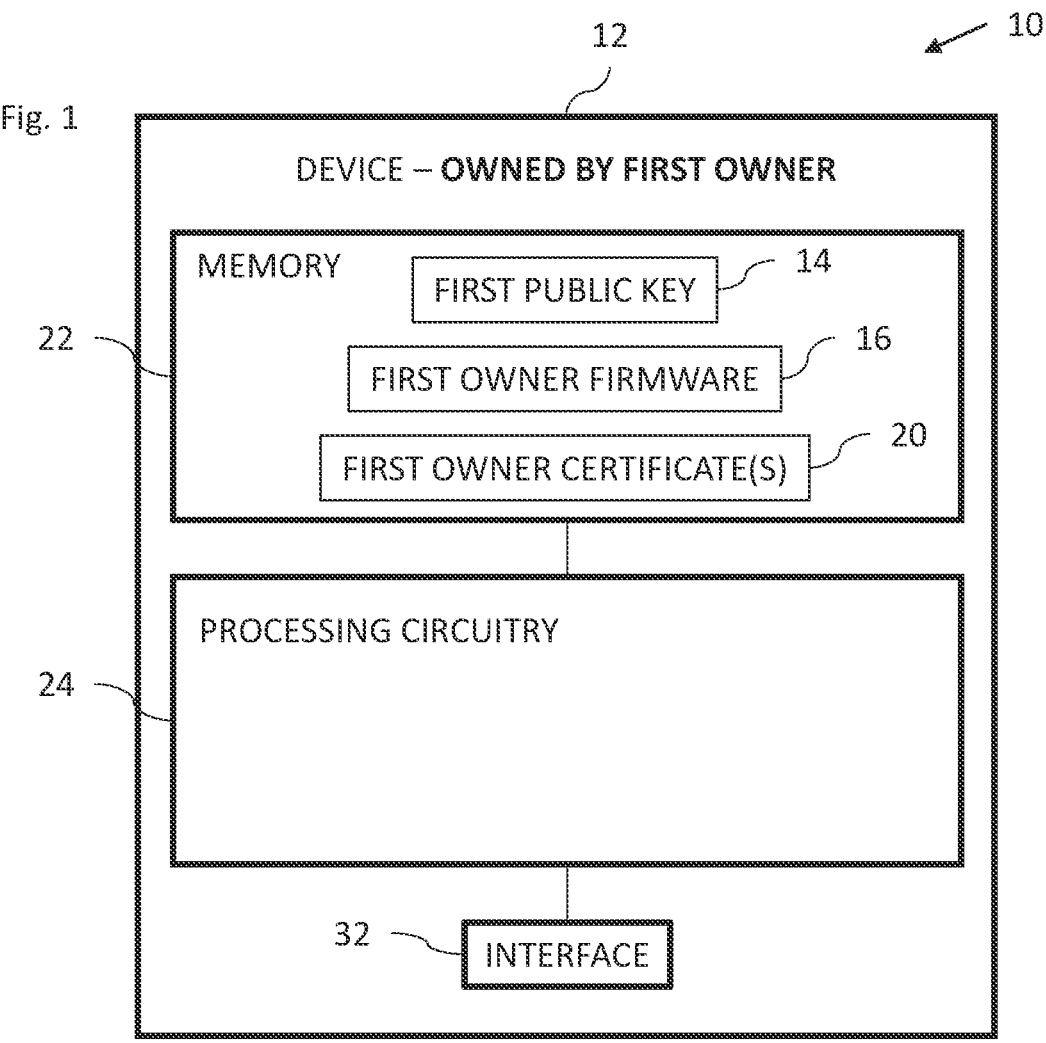
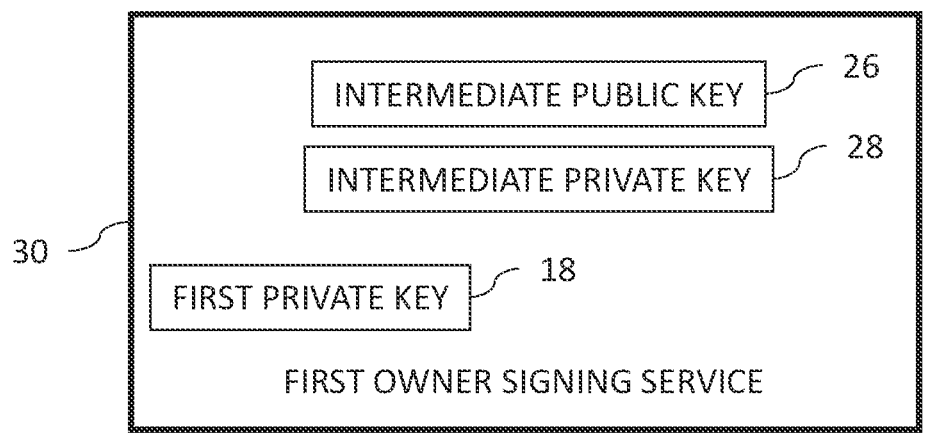
Fig. 1

Fig. 6
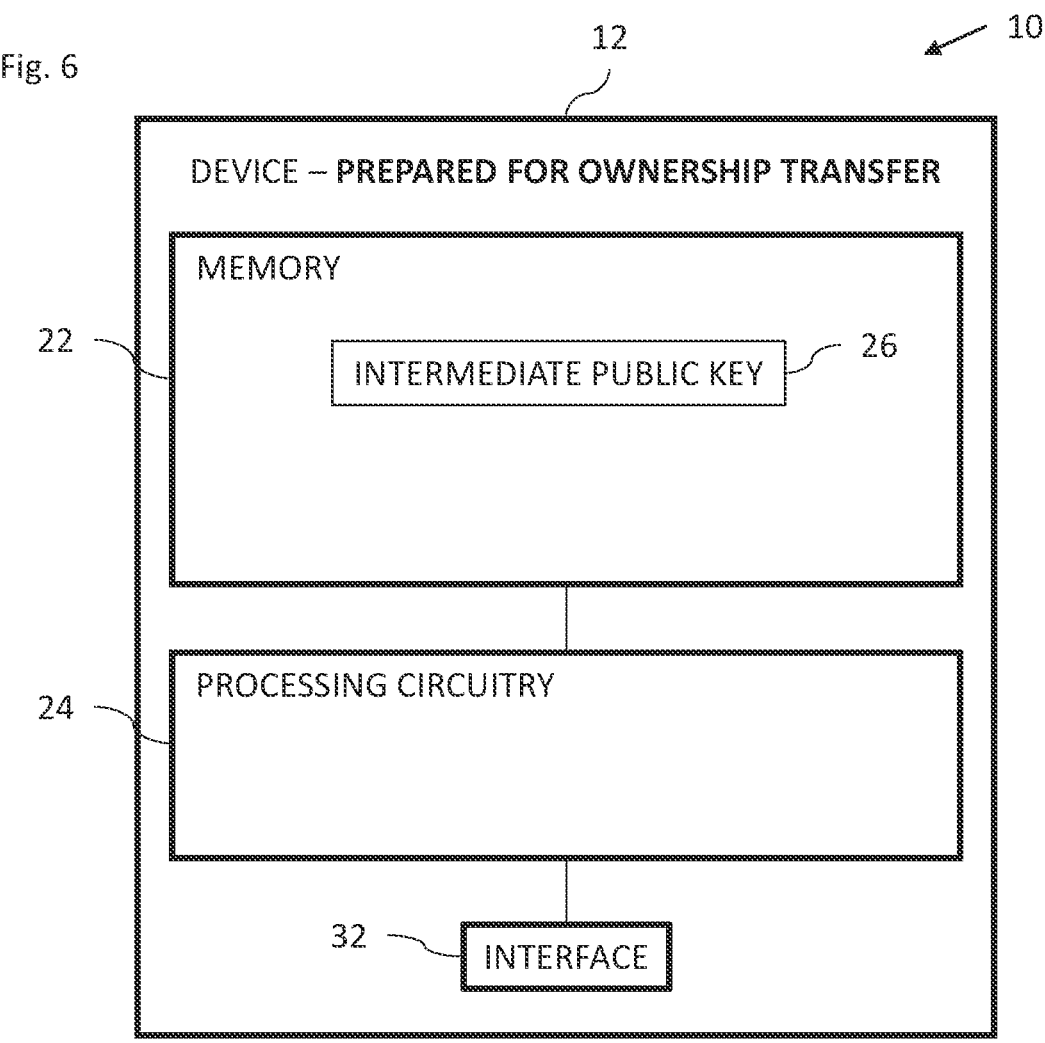
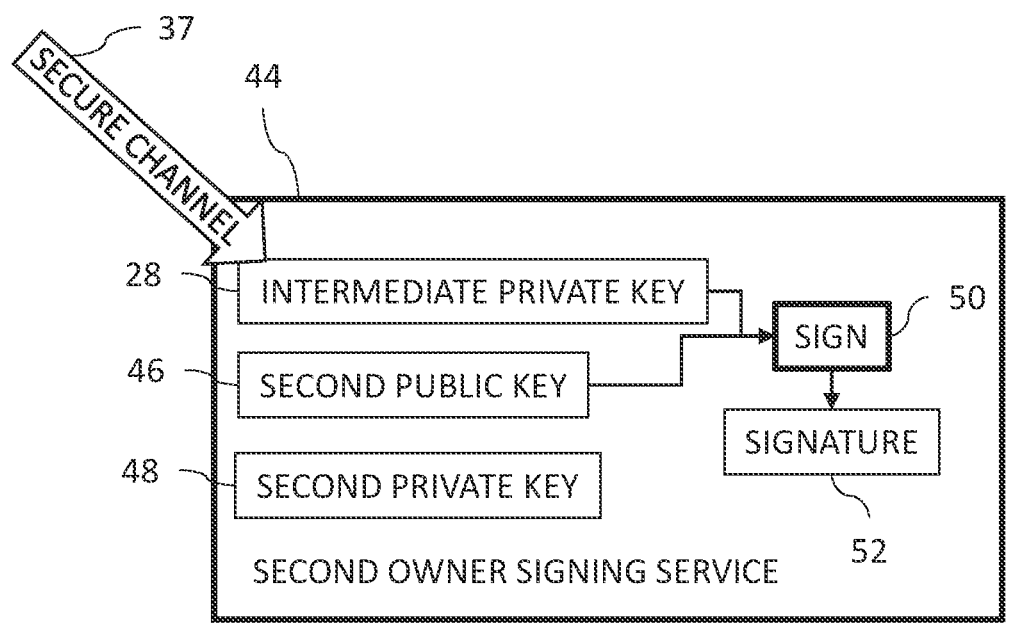

DEVICE CONTROL TRANSFER

RELATED APPLICATION INFORMATION

The present application claims benefit of U.S. Provisional Patent Application Ser. No. 63/432,415 of Eilam, et al., filed 14 Dec. 2022, the disclosure of which is hereby incorporated herein by reference.

FIELD OF THE INVENTION

The present invention relates to computer systems, and in particular, but not exclusively to, device control transfer.

BACKGROUND

Secure devices may use cryptographic authentication of software (e.g., firmware) as a condition to execute software on the devices. For example, a device may check the digital signature of software using a public key to determine that the software is approved for running on the device.

Control of the device is also known as "ownership" of the device. Ownership may imply one or more of the following: the ability to use the device to run software code coming from the "owner", i.e., signed by the credentials of the owner; blocking any 3rd party from loading their cryptographic credentials to the device, unless authorized by the "owner"; and the ability to authorize firmware authentication to a 3rd party, e.g., by signing a certificate for a 3rd party (e.g. a Cloud Solution Provider (CSP) customer), which is part of a 3rd party customer certificate chain used to authenticate the 3rd-party software.

At times, the owner may want to transfer ownership of a device to another entity in which the new owner acquires all ownership privileges, and the previous owner generally loses the ownership privileges of the device.

SUMMARY

There is provided in accordance with an embodiment of the present disclosure, a system including a device including a memory to store a first public key indicating security ownership of the device by a first owner, an interface to receive a signature of an intermediate public key signed by a first owner signing service with a first private key, which forms a first key pair with the first public key, and processing circuitry to load the intermediate public key in the memory in preparation for transferring ownership of the device from the first owner, responsively to authenticating the signature of the intermediate public key with the first public key, and remove the first public key from the memory, and wherein the interface is to receive a second public key and a signature of the second public key signed by a second owner signing service with an intermediate private key, which forms an intermediate key pair with the intermediate public key, the second public key and a second private key forming a second key pair, the processing circuitry is to load the second public key in the memory indicating ownership of the device has been transferred to the second owner responsively to authenticating the signature of the second public key with the intermediate public key, and the processing circuitry is to remove the intermediate public key from the memory.

Further in accordance with an embodiment of the present disclosure the processing circuitry is to overwrite the first public key in the memory with the intermediate public key while loading the intermediate public key in the memory.

Still further in accordance with an embodiment of the present disclosure the processing circuitry is to prevent loading of any public key unauthenticated by a given loaded public key, and allows loading of a public key signed by a given private key paired with the given loaded public key.

Additionally in accordance with an embodiment of the present disclosure the processing circuitry is to purge firmware and certificates signed by the first private key from the memory.

Moreover, in accordance with an embodiment of the present disclosure, the system includes the first owner signing service to sign the intermediate public key with the first private key.

Further in accordance with an embodiment of the present disclosure, the system includes the second owner signing service to generate the second key pair, sign the second public key with the intermediate private key, and provide the second public key and the signature of the second public key to the device.

Still further in accordance with an embodiment of the present disclosure the processing circuitry is to overwrite the intermediate public key in the memory with the second public key while loading the second public key in the memory.

Additionally in accordance with an embodiment of the present disclosure the interface is to receive a certificate container signed with the second private key, and the processing circuitry is to load a certificate associated with the signed certificate container in the memory.

Moreover in accordance with an embodiment of the present disclosure the interface is to receive a signature of the firmware, and the processing circuitry is to store the firmware in the memory or execute the firmware, responsively to authenticating the signature of firmware with a public key of a leaf certificate in a certificate chain with a root certificate of the second owner.

Further in accordance with an embodiment of the present disclosure, the system includes a measuring device to perform measurements on the device after transferring the ownership of the device, and compare the measurements performed after transferring ownership of the device to measurements performed before transferring ownership of the device to confirm that the device has not been tampered with.

Still further in accordance with an embodiment of the present disclosure the processing circuitry is to perform first measurements of the device before transferring the ownership of the device, sign the first measurements, provide a first report of the signed first measurements to the second owner signing service, perform second measurements of the device after transferring the ownership of the device, sign the second measurements, and provide a second report of the signed second measurements to the second owner signing service.

Additionally in accordance with an embodiment of the present disclosure the second owner signing service is to compare the first report to the second report to confirm that the device has not been tampered with.

Moreover, in accordance with an embodiment of the present disclosure the interface is to receive the signature of the intermediate public key and a device list signed by the first owner signing service with the first private key, the device list including a device identification of the device, and the processing circuitry is to load the intermediate public key in the memory in preparation for transferring ownership of the device from the first owner, responsively to authenticating the signature of the intermediate public key and the device list with the first public key.

Further in accordance with an embodiment of the present disclosure the device list includes device identifications of multiple devices.

There is also provided in accordance with another embodiment of the present disclosure, a control transfer method, including storing a first public key indicating security ownership of a device by a first owner, receiving a signature of an intermediate public key signed by a first owner signing service with a first private key, which forms a first key pair with the first public key, loading the intermediate public key in a memory of the device in preparation for transferring ownership of the device from the first owner, responsively to authenticating the signature of the intermediate public key with the first public key, removing the first public key from the memory, receiving a second public key and a signature of the second public key signed by a second owner signing service with an intermediate private key, which forms an intermediate key pair with the intermediate public key, the second public key and a second private key forming a second key pair, loading the second public key in the memory indicating ownership of the device has been transferred to the second owner responsively to authenticating the signature of the second public key with the intermediate public key, and removing the intermediate public key from the memory.

Still further in accordance with an embodiment of the present disclosure, the method includes preventing loading of any public key unauthenticated by a given loaded public key, and allows loading of a public key signed by a given private key paired with the given loaded public key.

Additionally in accordance with an embodiment of the present disclosure, the method includes purging firmware and certificates signed by the first private key from the memory.

Moreover, in accordance with an embodiment of the present disclosure, the method includes receiving a certificate container signed with the second private key, and loading a certificate associated with the signed certificate container in the memory.

Further in accordance with an embodiment of the present disclosure, the method includes receiving a signature of the firmware, and storing the firmware in the memory or executing the firmware, responsively to authenticating the signature of firmware with a public key of a leaf certificate in a certificate chain with a root certificate of the second owner.

Still further in accordance with an embodiment of the present disclosure, the method includes performing measurements on the device after transferring the ownership of the device, and comparing the measurements performed after transferring ownership of the device to measurements performed before transferring ownership of the device to confirm that the device has not been tampered with.

Additionally in accordance with an embodiment of the present disclosure, the method includes performing first measurements of the device before transferring the ownership of the device, signing the first measurements, providing a first report of the signed first measurements to the second owner signing service, performing second measurements of the device after transferring the ownership of the device, signing the second measurements, and providing a second report of the signed second measurements to the second owner signing service.

Moreover, in accordance with an embodiment of the present disclosure, the method includes comparing the first report to the second report to confirm that the device has not been tampered with.

Further in accordance with an embodiment of the present disclosure, the method includes receiving the signature of the intermediate public key and a device list signed by the first owner signing service with the first private key, the device list including a device identification of the device, and loading the intermediate public key in the memory in preparation for transferring ownership of the device from the first owner, responsively to authenticating the signature of the intermediate public key and the device list with the first public key.

Still further, in accordance with an embodiment of the present disclosure the device list includes device identifications of multiple devices.

BRIEF DESCRIPTION OF THE DRAWINGS

The present invention will be understood from the following detailed description, taken in conjunction with the drawings in which:

FIG. 1 is a block diagram view of an ownership transfer system constructed and operative in accordance with an embodiment of the present invention;

FIGS. 6-9 are block diagrams views of the system of FIG. 1 showing the device ownership being transferred to a second owner.

DESCRIPTION OF EXAMPLE EMBODIMENTS

Overview

Figure 2:
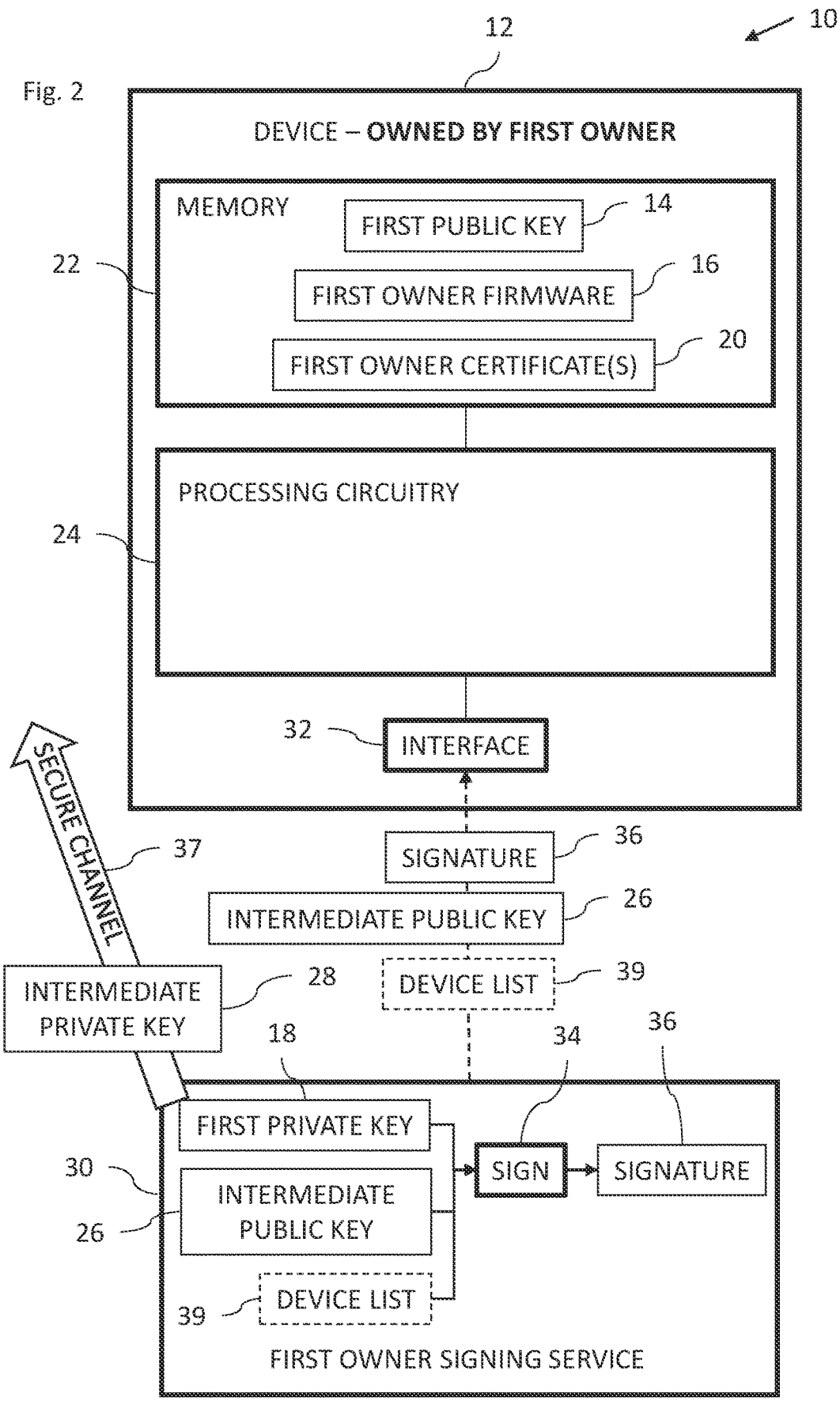
FIGS. 2-4 are block diagram views of the system of FIG. 1 showing preparation of a device for ownership transfer.

At times, the owner of a device may want to transfer ownership of the device to another entity. As a result of this, a new owner acquires one or more, and typically all, of the ownership privileges described above, and the previous owner generally loses the ownership privileges. Ownership transfer is open to potential security threats, both for the original owner (e.g., using residual information left on the device by the original owner for a cyber-attack on devices still owned by them), and the new owner (e.g., by a man-in-the-middle, leaving some "trojan horse" firmware on the device before new owner assumes possession). Therefore, device ownership transfer (DOT) procedures are meant to address these threats and minimize the probability of their occurrence.

DOT procedures may include loading of the new owner Root of Trust (ROT) credentials in a secure manner. This may be achieved by the new owner ROT credentials being signed by the "old" owner or the manufacturer and loading them in a secure way, with the device validating the loading based on authenticating the signature of the ROT credentials signed by the "old" owner or the manufacturer. Such schemes present a challenge for cases where a large number of devices and/or products are to undergo the DOT procedure, since scalability is difficult when every device is subject to transfer of information between the new owner and the original owner or the manufacturer.

Therefore, embodiments of the present invention address at least some of the above drawbacks by providing a device ownership transfer system which allows secure transfer of a device from a first owner to a second owner while limiting direct interaction between the second owner and the first owner and even without the need for the second owner to request that a signing service of the first owner signs credentials or other items (such as firmware) of the second owner.

In some embodiments, the device ownership transfer may even take place through a dealer who receives the device from the first owner and transfers the device to the second owner with limited direct interaction between the first owner and the dealer or the dealer and the second owner with respect to credentials loading and similar security feature transfer.

In some embodiments, the first owner loads the device with "intermediate ROT" credentials, such as an intermediate public key which is signed by the private key of the first owner and loaded onto the device. The sensitive data (such as ROT credentials and firmware) of the first owner are removed from the device leaving the intermediate ROT credentials. The device is shipped to the second owner (optionally via a dealer) with the loaded intermediate public key. In some embodiments, the intermediate private key is provided to a signing service of the second owner via a secure channel from the first owner and optionally via the dealer.

In some embodiments, the intermediate public key (or any other public key loaded onto the device) may be securely stored in non-volatile memory of the device using encryption and/or only be accessible by internal secure firmware of the device. In some embodiments, measurements (such as hashes of firmware, configuration values and anything which may influence the functionality of the device) are taken prior to transferring the device to the dealer or the second owner and after the device is transferred to the second owner to ensure that the device has not been tampered with using a man-in-the-middle attack.

The intermediate private key supplied to the second owner signing service is used to sign and load the new owner ROT credentials on the device. The new owner credentials then replace the intermediate credentials, e.g., the intermediate public key.

System Description

Reference is now made to FIG. 1, which is a block diagram view of an ownership transfer system 10 constructed and operative in accordance with an embodiment of the present invention.

The system 10 includes a device 12, currently owned by a first owner. The device 12 includes a memory 22 configured to store: a first public key 14 indicating security ownership of the device 12 by the first owner; first owner firmware 16 (signed by a private key corresponding to a public key of a leaf certificate in a certificate chain with a root certificate of the first owner); and at least one first owner certificate 20 (which prior to being loaded into the device 12, a signed container of the first owner certificate(s) 20 is verified by the first public key 14 of the first owner). The first public key 14 and the first private key 18 form a first key pair. It should be noted that other credentials, such as the first owner certificate(s) 20 also indicate security ownership of the device 12.

The device 12 includes processing circuitry 24, which is configured to prevent loading of any public key unauthenticated by a given loaded public key (e.g., the first public key 14) and allow loading of a public key signed by a given private key (e.g., the first private key 18) paired with the given loaded public key (e.g., the first public key 14). As will be explained in more detail below, once a public key is authenticated and loaded into the memory 22, the newly loaded public key may be used to authenticate another public key signed by a private key corresponding to the loaded public key.

In practice, some or all of the functions of the processing circuitry 24 may be combined in a single physical component or, alternatively, implemented using multiple physical components. These physical components may comprise hard-wired or programmable devices, or a combination of the two. In some embodiments, at least some of the functions of the processing circuitry 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
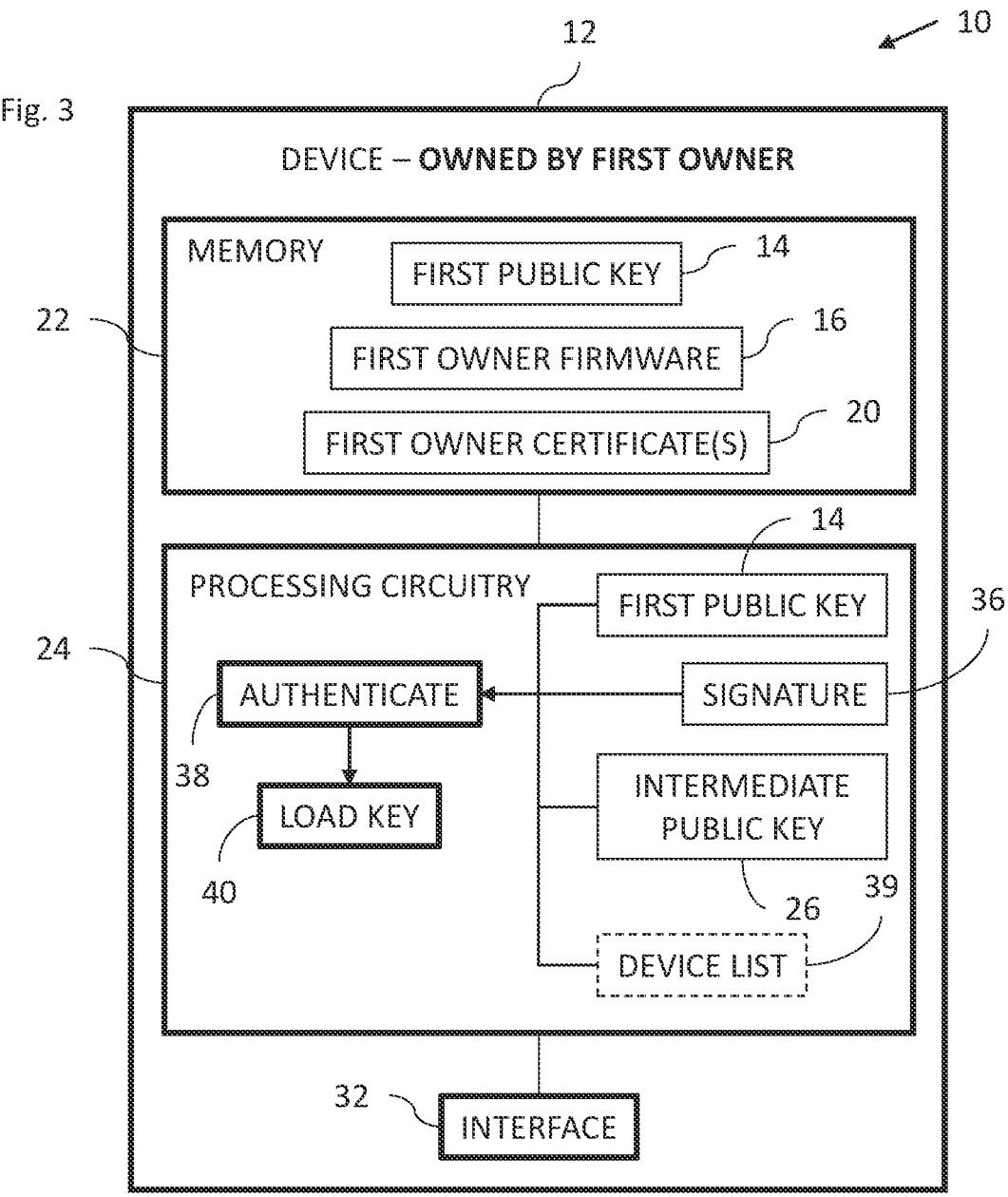
Figure 4:
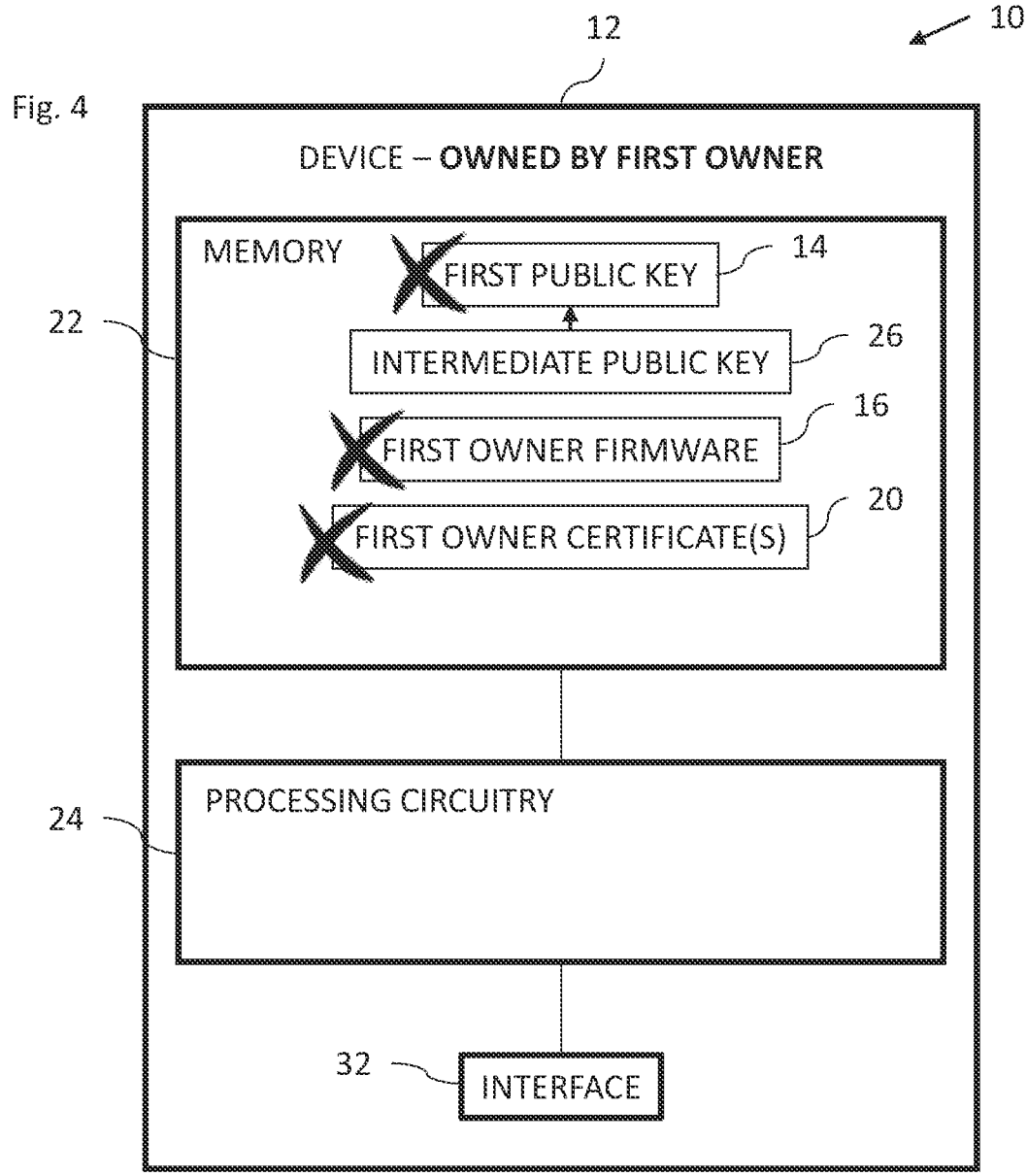

A first owner signing service 30 is configured to generate an intermediate key pair formed from an intermediate public key 26 and an intermediate private key 28 using any suitable public key infrastructure. Reference is made below to FIGS. 2-4, which are block diagram views of the system 10 of FIG. 1 showing preparation of the device 12 for ownership transfer.

Reference is now made to FIG. 2. In some embodiments, in order to restrict device ownership transfer to a given device or multiple given devices, a device list 39 is prepared including one or more device identifications (e.g., serial numbers or MAC addresses) of the device(s) for which device ownership is to be performed. The first owner signing service 30 is configured to: sign (block 34) the intermediate public key 26 and optionally the device list 39 with the first private key 18 yielding a signature 36; and provide the signature 36, the intermediate public key 26, and optionally the device list 39, to the device 12 directly or via another entity such as an administrative entity of the first owner (not shown), which receives the intermediate public key 26, the signature 36, and optionally the device list 39, from the first owner signing service 30 and provides the intermediate public key 26, the signature 36, and optionally the device list 39 to the device 12. The interface 32 is configured to receive the intermediate public key 26, the signature 36, and optionally the device list 39. In some embodiments, the intermediate private key 28 is provided to the second owner (optionally via a dealer) using a secure channel 37.

Reference is now made to FIG. 3. The processing circuitry 24 is configured to authenticate (block 38) the signature 36 of the intermediate public key 26, and optionally the device list 39, with the first public key 14 loaded in the memory 22. In response to authenticating the signature 36, the processing circuitry 24 is configured to load (block 40) the intermediate public key 26 in the memory 22, described in more detail with reference to FIG. 4.

Reference is now made to FIG. 4. The processing circuitry 24 is configured to load the intermediate public key 26 in the memory 22 in preparation for transferring ownership of the device 12 from the first owner, responsively to authenticating the signature 36 (FIG. 3) of the intermediate public key 26 with the first public key 14. The processing circuitry 24 is also configured to remove the first public key 14 from the memory 22. In some embodiments, the processing circuitry 24 is configured to overwrite the first public key 14 in the memory 22 with the intermediate public key 26 while loading the intermediate public key 26 in the memory 22. The processing circuitry 24 is also configured to securely store the intermediate public key 26 in the memory 22. In some embodiments, the intermediate public key 26 may be securely stored in non-volatile memory of the device 12 using encryption and/or only be accessible by internal secure firmware of the device 12.

The processing circuitry 24 is configured (e.g., triggered by the administrative entity of the first owner) to remove other credentials and private data of the first owner. In some embodiments, the processing circuitry 24 is configured to purge the first owner firmware 16 and first owner certificate(s) 20 from the memory 22.

Figure 5:
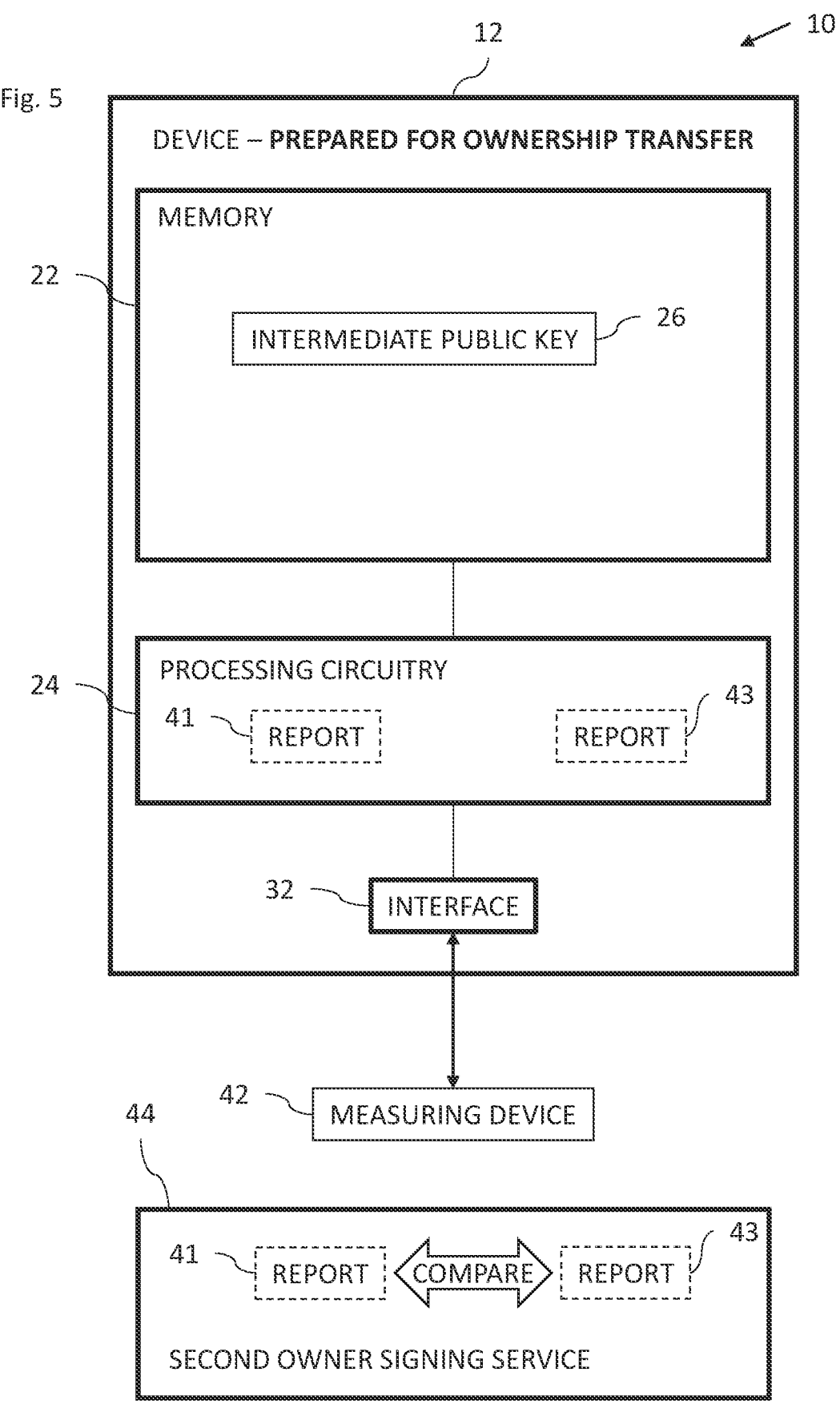
FIG. 5 is a block diagram view of the system of FIG. 1 showing the device prepared for ownership transfer.

Reference is now made to FIG. 5, which is a block diagram view of the system 10 of FIG. 1 showing the device 12 prepared for ownership transfer. FIG. 5 shows that the device 12 has been purged of credentials and other private data of the first owner. The memory 22 is storing the intermediate public key 26.

In some embodiments, measurements (such as hashes of firmware, configuration values and anything which may influence the functionality of the device 12) are taken prior to transferring the device 12 to the dealer or the second owner and after the device 12 is transferred to the second owner to ensure that the device 12 has not been tampered with using a man-in-the-middle attack. Therefore, in some embodiments, system 10 includes a measuring device 42 configured to: perform measurements on the device 12 before and after transferring the ownership of the device 12; and compare the measurements performed before and after transferring ownership of the device 12 to confirm that the device 12 has not been tampered with based on the measurements being unchanged. The measurement device used to perform measurements before transfer of ownership may not be the same measurement device used to perform measurements after transfer of ownership.

In some embodiments, the processing circuitry 24 is configured to perform measurements of the device 12 before and after transferring the ownership of the device 12. In some embodiments the processing circuitry 24 is configured to: perform first measurements (e.g., using Security Protocols and Data Models (SPDM) attestation) of the device 12 before transferring the ownership of the device 12; sign the first measurements using a private key; provide a first report 41 of the signed first measurements to the second owner signing service 44 (e.g. via the first owner signing service 30 or the dealer or the secure channel 37 or directly to the second owner signing service 44); perform second measurements of the device 12 after transferring the ownership of the device 12; sign the second measurements using a private key; and provide a second report 43 of the signed second measurements to the second owner signing service 44. The second owner signing service 44 is configured to authenticate the first and second reports 41, 43 using a public key (or keys) and compare the first report 41 to the second report 43 to confirm that the device 12 has not been tampered with.

Reference is made below to FIGS. 6-9, which are block diagrams views of the system 10 of FIG. 1 showing the device 12 ownership being transferred to the second owner.

Reference is now made to FIG. 6. In some embodiments, the intermediate private key 28 is provided to a second owner signing service 44 from the first owner signing service 30 (optionally via the dealer) using secure channel 37.

The second owner signing service 44 is configured to: generate the second key pair including the second public key 46 and the second private key 48; and sign (block 50) the second public key 46 with the intermediate private key 26 yielding a signature 52.

Figure 7:
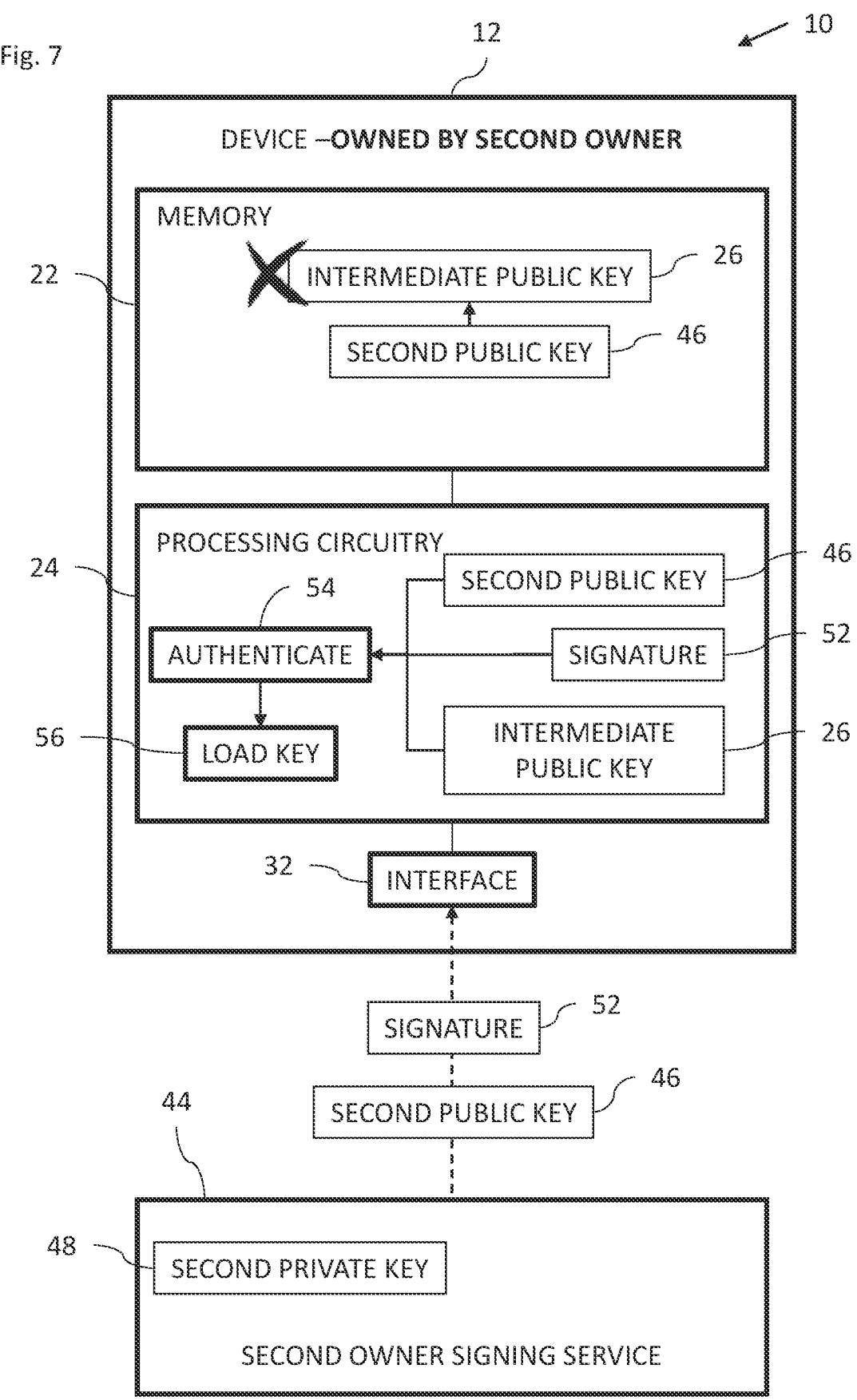

Reference is now made to FIG. 7. The second owner signing service 44 is configured to provide the second public key 46 and the signature 52 of the second public key 46 to the device 12 directly or via the administrative entity of the second owner. The interface 32 is configured to receive from the second public key 46 and the signature 52 (of the second public key 46 signed with the intermediate private key 28 by the second owner signing service 44). The processing circuitry 24 is configured to authenticate (block 54) the signature 52 of the second public key 46 using the intermediate public key 26. The processing circuitry 24 is configured to: load (block 56) the second public key 46 in the memory 22 indicating ownership of the device 12 has been transferred to the second owner responsively to authenticating the signature 52 of the second public key 46 with the intermediate public key 26; and remove the intermediate public key 26 from the memory 22. In some embodiments, the processing circuitry 24 is configured to overwrite the intermediate public key 26 in the memory 22 with the second public key 46 while loading the second public key 46 in the memory 22.

Figure 8:
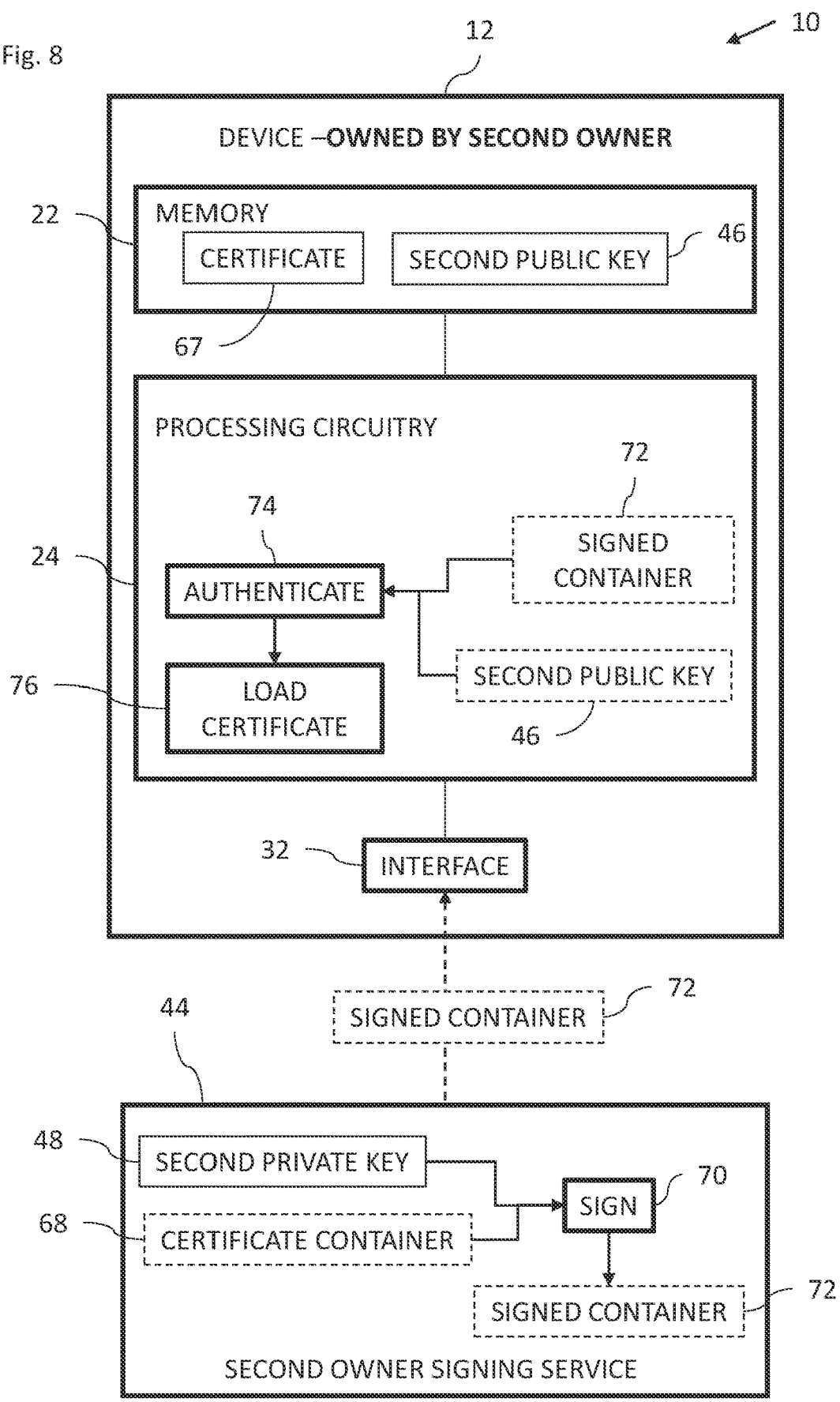

Reference is now made to FIG. 8. The administrative entity of the second owner may want to add load a certificate 67 onto the device 12. The certificate 67 may have an embedded signature which is not necessarily signed by the second private key 48. The certificate 67 may be self-signed (i.e., have a signature by a key corresponding to the public key embedded in the certificate 67, but different from the second public key 46). The certificate 67 is loaded to the device 12 using a container 68, which is signed by the second private key 48 and is thus validated by the second public key 46 already loaded to the device 12, as described in more detail below.

The second owner signing service 44 is configured to sign (block 70) the certificate container 68 with the second private key 48 yielding a signed certificate container 72. The second owner signing service 44 is configured to provide the signed certificate 72 to the device 12 directly or via the administrative entity of the second owner. The interface 32 is configured to receive the signed certificate container 72 signed with the second private key 48. The processing circuitry 24 is configured to authenticate (block 74) the signed certificate container 72 using the second public key 46; and load (block 76) the certificate 67 associated with the signed certificate container 72 in the memory 22 responsively to the signed certificate 72 being authenticated.

Figure 9:
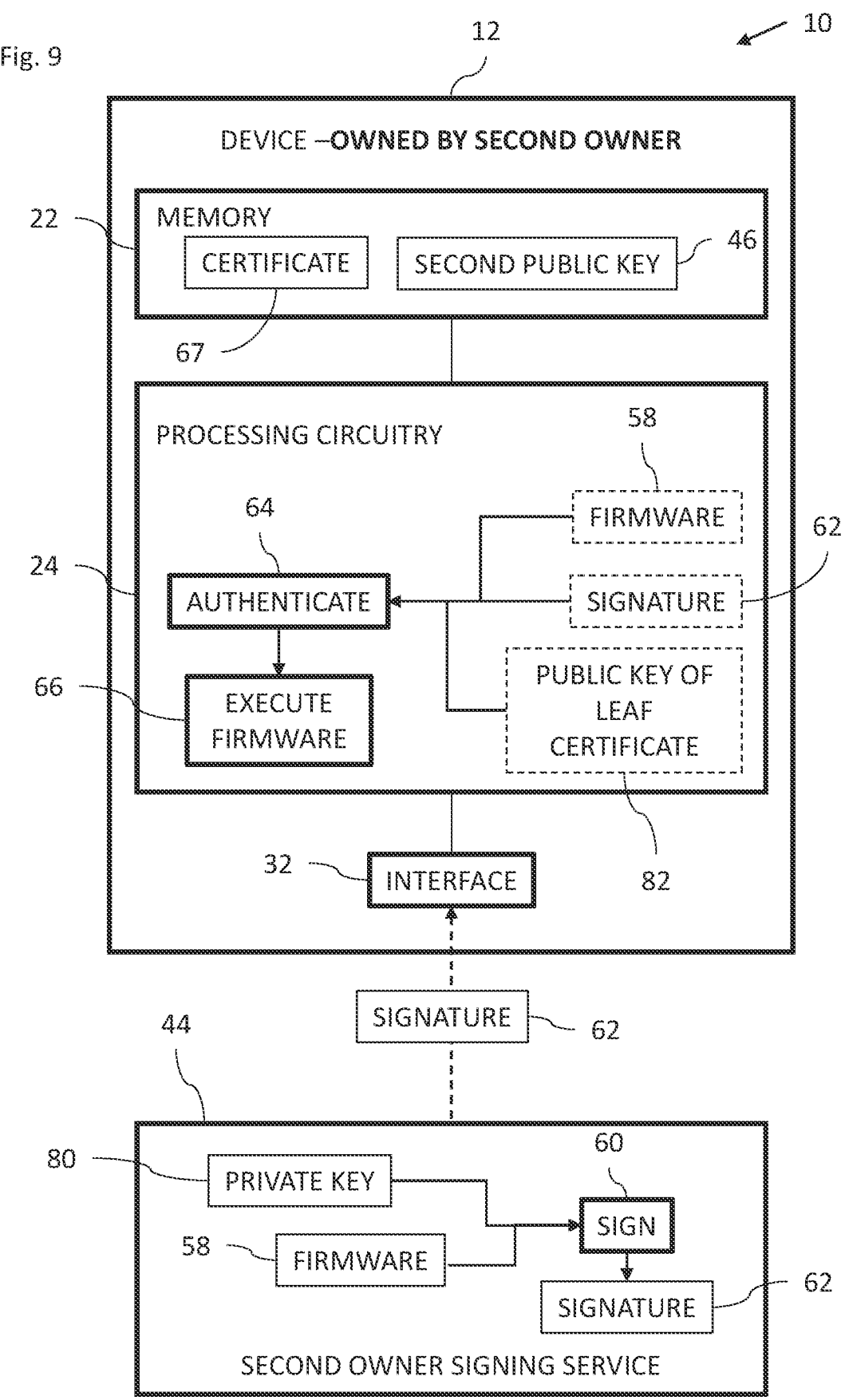

Reference is now made to FIG. 9. The second owner (e.g., the administrative entity of the second owner) provides firmware 58 to the second owner signing service 44 with a request for the second owner signing service 44 to sign the firmware 58 with a private key 80 corresponding to a public key 82 of a leaf certificate (not shown) in a certificate chain with a root certificate (e.g., the certificate 67) of the second owner.

The second owner signing service 44 is configured to receive the firmware 58 and sign (block 60) the firmware 58 with the private key 80 corresponding to the public key 82 of the leaf certificate in the certificate chain with the root certificate of the second owner yielding a signature 62, which the second owner signing service 44 is configured to provide to the device 12 via the administrative entity of the second owner or directly via the interface 32. The interface 32 is configured to receive the signature 62 of the firmware 58. The processing circuitry is configured to: authenticate (block 64) the signature 62 of the firmware 58 using the public key 82 of the leaf certificate; and store the firmware 58 in the memory 22 for later execution of the firmware 58 responsively to authenticating the signature 62 of firmware 58; or execute (block 66) the firmware 58 responsively to authenticating the signature 62 of firmware 58.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A system comprising a device including:
a memory to store a first public key indicating security ownership of the device by a first owner;
an interface to receive a signature of an intermediate public key signed by a first owner signing service with a first private key, which forms a first key pair with the first public key; and
processing circuitry to:
load the intermediate public key in the memory in preparation for transferring ownership of the device from the first owner, responsively to authenticating the signature of the intermediate public key with the first public key; and
remove the first public key from the memory;
and wherein:
the interface is to receive a second public key and a signature of the second public key signed by a second owner signing service with an intermediate private key, which forms an intermediate key pair with the intermediate public key, the second public key and a second private key forming a second key pair;
the processing circuitry is to load the second public key in the memory indicating ownership of the device has been transferred to the second owner responsively to authenticating the signature of the second public key with the intermediate public key; and
the processing circuitry is to remove the intermediate public key from the memory.

2. The system according to claim 1, wherein the processing circuitry is to overwrite the first public key in the memory with the intermediate public key while loading the intermediate public key in the memory.

3. The system according to claim 1, wherein the processing circuitry is to prevent loading of any public key unauthenticated by a given loaded public key; and allows loading of a public key signed by a given private key paired with the given loaded public key.

4. The system according to claim 1, wherein the processing circuitry is to purge firmware and certificates signed by the first private key from the memory.

5. The system according to claim 1, further comprising the first owner signing service to sign the intermediate public key with the first private key.

6. The system according to claim 1, further comprising the second owner signing service to:
generate the second key pair;
sign the second public key with the intermediate private key; and
provide the second public key and the signature of the second public key to the device.

7. The system according to claim 1, wherein the processing circuitry is to overwrite the intermediate public key in the memory with the second public key while loading the second public key in the memory.

8. The system according to claim 1, wherein:
the interface is to receive a certificate container signed with the second private key; and
the processing circuitry is to load a certificate associated with the signed certificate container in the memory.

9. The system according to claim 1, wherein:
the interface is to receive a signature of the firmware; and
the processing circuitry is to store the firmware in the memory or execute the firmware, responsively to authenticating the signature of firmware with a public key of a leaf certificate in a certificate chain with a root certificate of the second owner.

10. The system according to claim 1, further comprising a measuring device to:
perform measurements on the device after transferring the ownership of the device; and
compare the measurements performed after transferring ownership of the device to measurements performed before transferring ownership of the device to confirm that the device has not been tampered with.

11. The system according to claim 1, wherein the processing circuitry is to:
perform first measurements of the device before transferring the ownership of the device;
sign the first measurements;
provide a first report of the signed first measurements to the second owner signing service;
perform second measurements of the device after transferring the ownership of the device;
sign the second measurements; and
provide a second report of the signed second measurements to the second owner signing service.

12. The system according to claim 11, wherein the second owner signing service is to compare the first report to the second report to confirm that the device has not been tampered with.

13. The system according to claim 1, wherein:
the interface is to receive the signature of the intermediate public key and a device list signed by the first owner signing service with the first private key, the device list including a device identification of the device; and
the processing circuitry is to load the intermediate public key in the memory in preparation for transferring ownership of the device from the first owner, responsively to authenticating the signature of the intermediate public key and the device list with the first public key.

14. The system according to claim 13, wherein the device list includes device identifications of multiple devices.

15. A control transfer method, comprising:
storing a first public key indicating security ownership of a device by a first owner;
receiving a signature of an intermediate public key signed by a first owner signing service with a first private key, which forms a first key pair with the first public key;

loading the intermediate public key in a memory of the device in preparation for transferring ownership of the device from the first owner, responsively to authenticating the signature of the intermediate public key with the first public key;

removing the first public key from the memory;

receiving a second public key and a signature of the second public key signed by a second owner signing service with an intermediate private key, which forms an intermediate key pair with the intermediate public key, the second public key and a second private key forming a second key pair;

loading the second public key in the memory indicating ownership of the device has been transferred to the second owner responsively to authenticating the signature of the second public key with the intermediate public key; and removing the intermediate public key from the memory.

16. The method according to claim 15, further comprising preventing loading of any public key unauthenticated by a given loaded public key; and allows loading of a public key signed by a given private key paired with the given loaded public key.

17. The method according to claim 15, further comprising purging firmware and certificates signed by the first private key from the memory.

18. The method according to claim 15, further comprising:

receiving a certificate container signed with the second private key; and loading a certificate associated with the signed certificate container in the memory.

19. The method according to claim 15, further comprising:

receiving a signature of the firmware; and storing the firmware in the memory or executing the firmware, responsively to authenticating the signature of firmware with a public key of a leaf certificate in a certificate chain with a root certificate of the second owner.

20. The method according to claim 15, further comprising:

performing measurements on the device after transferring the ownership of the device; and comparing the measurements performed after transferring ownership of the device to measurements performed before transferring ownership of the device to confirm that the device has not been tampered with.

21. The method according to claim 15, further comprising:

performing first measurements of the device before transferring the ownership of the device;

signing the first measurements;

providing a first report of the signed first measurements to the second owner signing service;

performing second measurements of the device after transferring the ownership of the device;

signing the second measurements; and providing a second report of the signed second measurements to the second owner signing service.

22. The method according to claim 21, further comprising comparing the first report to the second report to confirm that the device has not been tampered with.

23. The method according to claim 15, further comprising:

receiving the signature of the intermediate public key and a device list signed by the first owner signing service with the first private key, the device list including a device identification of the device; and loading the intermediate public key in the memory in preparation for transferring ownership of the device from the first owner, responsively to authenticating the signature of the intermediate public key and the device list with the first public key.

24. The method according to claim 23, wherein the device list includes device identifications of multiple devices.

* * * * *